US012801099B2

(12) United States Patent
Wang et al.

(10) Patent No.: US 12,801,099 B2
(45) Date of Patent: Nov. 17, 2026

(54) STATIC OUTPUT FEEDBACK CONTROL METHOD FOR FORKLIFT STABILITY CONTROL AND STORAGE MEDIUM

(71) Applicant: ANHUI HELI CO., LTD., Anhui (CN)

(72) Inventors: Ping Wang, Anhui (CN); Sheng Bi, Anhui (CN); Donglin Zhang, Anhui (CN); Xueyin Shi, Anhui (CN); Xiaodong Zheng, Anhui (CN); Guang Xia, Anhui (CN)

(73) Assignee: ANHUI HELI CO., LTD., Anhui (CN)

( * ) Notice: Subject to any disclaimer, the term of this patent is extended or adjusted under 35 U.S.C. 154(b) by 296 days.

(21) Appl. No.: 18/708,212

(22) PCT Filed: May 26, 2023

(86) PCT No.: PCT/CN2023/096459
§ 371 (c)(1),
(2) Date: May 8, 2024

(87) PCT Pub. No.: WO2023/236786
PCT Pub. Date: Dec. 14, 2023

(65) Prior Publication Data

US 2025/0004431 A1 Jan. 2, 2025

(30) Foreign Application Priority Data

Jun. 9, 2022 (CN) ......................... 202210652559.7

(51) Int. Cl.
*G05B 13/02* (2006.01)
*B66F 17/00* (2006.01)
*G06N 7/02* (2006.01)

(52) U.S. Cl.
CPC ........ *G05B 13/0275* (2013.01); *B66F 17/003* (2013.01); *G06N 7/02* (2013.01)

(58) Field of Classification Search
CPC ... B66F 17/003; G05B 13/0275; G05B 13/04; G05B 19/0428; G05B 23/024; G06N 7/02
See application file for complete search history.

(56) References Cited

U.S. PATENT DOCUMENTS

2013/0078968 A1* 3/2013 Breed .................. G01S 13/878 455/414.1
2021/0221354 A1* 7/2021 Jin .......................... B60T 8/243
2023/0104727 A1* 4/2023 Oda .................... B60W 40/103 701/93

FOREIGN PATENT DOCUMENTS

CN 102436179 5/2012
CN 110161847 8/2019
(Continued)

OTHER PUBLICATIONS

"International Search Report (Form PCT/ISA/210) of PCT/CN2023/096459", mailed on Sep. 18, 2023, with English translation thereof, pp. 1-5.
(Continued)

*Primary Examiner* — Tameem D Siddiquee
(74) *Attorney, Agent, or Firm* — JCIPRNET

(57) ABSTRACT

The invention discloses a static output feedback control method for forklift stability control and a storage medium. The control method comprises setting a Fuzzy system model, a singular observer module, a generalized observer module, a residual generator module, a static output feedback control method module for forklift stability control. The singular observer estimates the state and faults of the system simultaneously. The generalized observer is used to generate a residual signal that is as sensitive as possible to faults and insensitive to disturbances. The residual generator minimizes the system's sensitivity to disturbances while maximizing its sensitivity to faults. The static output feedback control method for forklift stability control uses mea-
(Continued)

surable signals such as faults and states provided by the observer to control the dynamic system.

6 Claims, 8 Drawing Sheets

(56) References Cited

FOREIGN PATENT DOCUMENTS

| | | | |
|---|---|---|---|
| CN | 111645697 | * | 9/2020 |
| CN | 113003493 | | 6/2021 |
| CN | 113459757 | | 10/2021 |
| CN | 114967656 | | 8/2022 |
| KR | 20210075479 | | 6/2021 |

OTHER PUBLICATIONS

"Written Opinion of the International Searching Authority (Form PCT/ISA/237) of PCT/CN2023/096459", mailed on Sep. 18, 2023, pp. 1-6.

* cited by examiner

STATIC OUTPUT FEEDBACK CONTROL METHOD FOR FORKLIFT STABILITY CONTROL AND STORAGE MEDIUM

CROSS-REFERENCE TO RELATED APPLICATION

This application is a 371 of international application of PCT application serial no. PCT/CN2023/096459, filed on May 26, 2023, which claims the priority benefit of China application no. 202210652559.7, filed on Jun. 9, 2022. The entirety of each of the above-mentioned patent application is hereby incorporated by reference herein and made a part of this specification.

TECHNICAL FIELD

The invention relates to the field of vehicle safety control, and in particular to a static output feedback control method for forklift stability control and a storage medium.

BACKGROUND

In the field of active safety technology for forklifts, although the anti-rollover system is becoming increasingly perfect, fault-tolerant control technology for sensor failures in the anti-rollover system of counterbalanced forklifts has not yet been applied. If a sensor failure occurs in the forklift anti-rollover system, the system cannot normally receive the required forklift operating information, and the system will lose its operating state during operation. At the same time, the safety and stability of the forklift during driving cannot be guaranteed. Therefore, fault-tolerant control of the forklift anti-rollover system is essential.

SUMMARY

The present invention proposes a static output feedback control method for forklift stability control and a storage medium, which can solve the above technical disadvantages.

In order to achieve the above objects, the present invention provides the following technical solutions:

A static output feedback control method for forklift stability control, comprising the following steps:

constructing a continuous-time forklift anti-rollover fuzzy system model with formula (1);

$$\begin{cases} \dot{x}(t) & = \sum_{i=1}^{r} u_i(\xi(t))(A_i x(t) + B_i u(t)) + B_d d(t) \\ y(t) & = Cx(t) + D_f f(t) \end{cases} \tag{1-1}$$

wherein in formula (1-1) x(t) represents a state vector at time t; $f(t)\in R^s$ is a sensor fault vector; $d(t)\in R^{nd}$ is an unknown bounded disturbance vector; matrix $B_d$ and $D_f$ have appropriate dimensions, and at the same time $D_f$ is assumed to be a full column rank;

using an excitation function $u_i(\xi(t))$ as an input of the system by setting the continuous-time fuzzy system model, and sensor failures and unknown bounded disturbances existing simultaneously;

setting a singular observer for estimating a state $\bar{\hat{x}}(t)$ of the counterbalanced forklift anti-rollover fuzzy system and an output failure $\bar{\hat{y}}(t)$ simultaneously;

setting a generalized observer for measuring a state of the counterbalanced forklift anti-rollover system in continuous time and performing fault estimation, generating a residual signal $L_2$ that is as sensitive to faults f(t) as possible and insensitive to disturbances d(t);

extending $H_\infty$ control problem to nonlinear situations by setting a residual generator and using the residual signal $L_2$ for control, observing an minimized interference signal $r_d(t)$ to obtain a gain of the residual signal $L_2$, finding a corresponding positive definite matrix and a positive scalar, and then progressively estimating system state and sensor failures;

reconfiguring control laws through the fault and state estimation provided by the above observer, and giving sufficient conditions in form of LMIs to ensure a stability of a resulting closed-loop system.

Further, the singular observer is used to simultaneously estimate the system state $\bar{\hat{x}}(t)$ and output failure $\bar{\hat{y}}(t)$, as follows:

$$\begin{cases} E\dot{v}(t) & = \sum_{i=1}^{r} \mu_i\left(\hat{\xi}(t)\right)\left(S_i v(t) + \bar{B}_i u(t)\right) \\ \hat{\bar{x}}(t) & = v(t) + Ly(t) \\ \hat{y}(t) & = C_0 \hat{x}(t) = C\hat{x}(t) \end{cases} \tag{1-2}$$

wherein in formula (1-2), $v(t)\in R^{n+p}$ is an auxiliary state vector of the observer; $\bar{\hat{x}}(t)\in R^{n+p}$ is an estimation of $\bar{x}(t)$; $\hat{\xi}(t)$ is an unmeasured premise variable; $S_i$, E, L are observer gains.

Further, formula (1-3) is used to construct the generalized observer $H(t)\in L_2$, and a norm of $L_2$ is defined as:

$$\|H(t)\|_2 = \left(\int_0^{+\infty} H^T(t) H(t)\, dt\right)^{1/2} \tag{1-3}$$

Further, formula (1-4) is used to construct a residual generator $r_d(t)$.

$$r_d(t) = \sum_{i=1}^{r} u_i(\xi(t)) V_i C_0 e_d(t) \tag{1-4}$$

Further, formula (1-5) is used to design a control law of the reconfigured static output feedback controller:

$$\begin{cases} u(t) & = \sum_{i=1}^{r} \mu_i\left(\hat{\xi}(t)\right) K_i y_c(t) \\ y_c(t) & = y(t) - \hat{h}(t) = y(t) - \ell\hat{\bar{x}}(t) \end{cases} \tag{1-5}$$

In formula (1-5), $K_i$ is an output feedback gain to be determined; $y_c(t)$ is a compensation output; $\hat{h}(t)$ is an estimated system output; $l=[0\ I_P]$.

In another aspect, the present invention also discloses a computer readable storage medium storing a computer program, when the computer program is executed by a processor, the processor performs the steps of the method.

It can be seen from the above technical solutions that the static output feedback control method for forklift stability control and the storage medium of the present invention are expected to improve the fault tolerance of the counterbalanced forklift anti-rollover system, thereby ensuring the stability of the forklift anti-rollover system and improving the active safety of forklifts. Specifically, when a sensor fails, the proposed state observer can estimate the sensor output signal and fault state, and the fault signal can be accurately received, and the output signal can be compensated and output in time according to the static output feedback control method. Then the system is minimally affected by sensor failure, ensuring the effectiveness of most functions of the controller.

Compared with the prior art, the beneficial effects of the present invention are:

1. It can ensure that when the system premise variables are unmeasured, the corresponding state and fault vectors can still be obtained.
2. After a system failure occurs, it can ensure the reconfiguration of the control law based on the estimated state and fault vectors, and restore the performance of the system as much as possible before the failure.
3. The fault tolerance of the forklift anti-rollover system is improved, whereby greatly improving the lateral stability and active safety of the forklift.

DESCRIPTION OF THE EMBODIMENTS

To make the purpose, technical solutions and advantages of the embodiments of the present invention clearer, the technical solutions in the embodiments of the present invention will be clearly and completely described below in conjunction with the drawings in the embodiments of the present invention. Obviously, the described embodiments are only some of the embodiments of the present invention, rather than all the embodiments.

Embodiment 1

Figure 1:
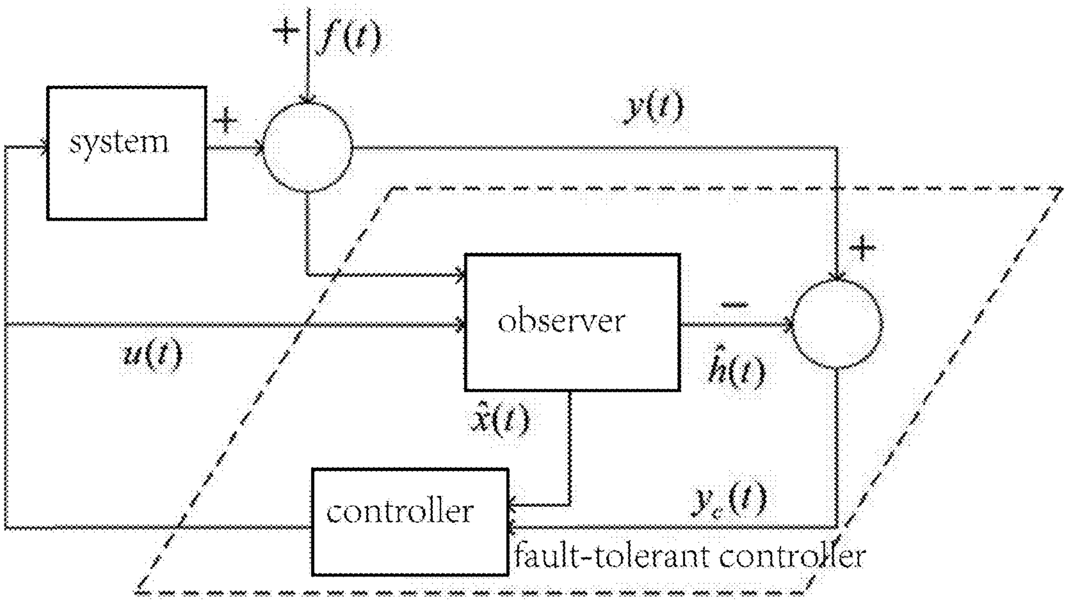
FIG. 1 is a system diagram of fault-tolerant control of sensor failure of the forklift anti-rollover system.

The static output feedback control method for forklift stability control described in this embodiment is shown in FIG. 1, comprising setting a continuous-time fuzzy system model, a singular observer, a generalized observer, a residual generator, and a static output feedback controller. Specifically, it comprises the following steps:

constructing a continuous-time forklift anti-rollover fuzzy system model with formula (1);

$$\begin{cases} \dot{x}(t) & = \sum_{i=1}^{r} u_i\left(\hat{\xi}(t)\right)\left(A_i x(t) + B_i u(t)\right) + B_d d(t) \\ y(t) & = Cx(t) + D_f f(t) \end{cases} \tag{1-1}$$

wherein in formula (1-1), x(t) represents a state vector at time t; $f(t) \in R^s$ is a sensor fault vector; $d(t) \in R^{nd}$ is an unknown bounded disturbance vector; matrix $B_d$ and $D_f$ have appropriate dimensions, and at the same time $D_f$ is assumed to be a full column rank;

using an excitation function $u_i(\xi(t))$ as an input of the system by setting the continuous-time fuzzy system model, and sensor failures and unknown bounded disturbances existing simultaneously;

setting the singular observer for estimating a state $\bar{x}(t)$ of the counterbalanced forklift anti-rollover fuzzy system and an output failure $\bar{y}(t)$ simultaneously;

setting a generalized observer for measuring a state of the counterbalanced forklift anti-rollover system in continuous time and performing fault estimation, generating a residual signal $L_2$ that is as sensitive to faults f(t) as possible and insensitive to disturbances d(t);

extending $H_\infty$ control problem to nonlinear situations by setting a residual generator and using the residual signal $L_2$ for control, observing an minimized interference signal $r_d(t)$ to obtain a gain of the residual signal $L_2$, finding a corresponding positive definite matrix and a positive scalar, and then progressively estimating system state and sensor failures;

reconfiguring control laws through the fault and state estimation provided by the above observer, and giving sufficient conditions in form of LMIs to ensure a stability of a resulting closed-loop system.

The following are detailed descriptions respectively, and the continuous-time fuzzy system model is designed according to the following steps:

Step 11. When the forklift body tilts, the forklift tires themselves also deform. Similarly, when the forklift turns at high speed, the deformation of the forklift tires will also become larger, which will lead to a larger side slip angle of the tires, because the force characteristic curves of the forklift tires are not always approximately linear. Therefore, the present invention adopts a typical nonlinear tire model in vehicle research, which is more common in vehicle stability research, that is, the magic formula model. Therefore, the lateral force of the front and rear tires is $F_{yf}$; and $F_{yr}$ can be expressed as:

$$F_{yf} = D_f(\sigma)\sin\left[L_f(\sigma)\tan^{-1}\left\{G_f(\sigma)\times(1 - V_f(\sigma))\alpha_f + V_f(\sigma)\tan^{-1}(G_f(\sigma)\alpha_f)\right\}\right] \tag{2-1}$$

$$F_{yr} = D_r(\sigma)\sin\left[L_r(\sigma)\tan^{-1}\left\{G_r(\sigma)\times(1 - V_r(\sigma))\alpha_r + V_r(\sigma)\tan^{-1}(G_r(\sigma)\alpha_r)\right\}\right] \tag{2-2}$$

In the formula, $\alpha_f$ and $\alpha_r$ are the side slip angles of the front and rear tires of the forklift, respectively. In addition, for the parameters $D_i$, $L_i$, $G_i$ and $V_i$(i=f,r) in the above formula, their values are influenced by many factors, the key ones include traveling speed, wheel adhesion, and wheel force characteristics.

Step 12. based on TS fuzzy model, for an estimation of the nonlinear characteristics of the front lateral force, using sliding region $M_1$; for an estimation of nonlinear characteristics of rear lateral force, using sliding region $M_2$; if $|\alpha_f|$ belong to $M_1$, then:

$$\begin{cases} F_{yf} & = C_{f1}(\sigma)\alpha_f \\ F_{yr} & = C_{r1}(\sigma)\alpha_r \end{cases} \tag{2-3}$$

If $|\alpha_f|$ belong to $M_2$, then:

$$\begin{cases} F_{yf} & = C_{f2}(\sigma)\alpha_f \\ F_{yr} & = C_{r2}(\sigma)\alpha_r \end{cases} \tag{2-4}$$

In formulas (2-3) and (2-4), $C_{fi}$(i=1, 2) and $C_{ri}$(i=1, 2) are the cornering stiffness of the front and rear tires, respectively, and their values are affected by many factors, including tire width, load mass, wheel adhesion and vehicle speed.

Step 13. the lateral force of the front and rear tires of the forklift is expressed as follows:

$$\begin{cases} F_{yf} & = \lambda_1(|\alpha_f|)C_{f1}(\sigma)\alpha_f + \lambda_2(|\alpha_f|)C_{f2}(\sigma)\alpha_f \\ F_{yr} & = \lambda_1(|\alpha_f|)C_{r1}(\sigma)\alpha_r + \lambda_2(|\alpha_f|)C_{r2}(\sigma)\alpha_r \end{cases} \tag{2-5}$$

In formula (2-5), $\lambda_i(|\alpha_f|)$(i=1, 2) is a weighting function about variables $|\alpha_f|$, this weighting function satisfies the following properties: $0 \le \lambda_i(|\alpha_f|) \le 1$ and $$\sum_{i=1}^{2} \lambda_i(|\alpha_f|) = 1.$$

Step 14. Assuming that the side slip angles of the front and rear tires of the forklift are very small, $\alpha_f = \beta - (a\omega/v_x)$ and $\alpha_r = \delta - \beta - (b\omega/v_x)$ can be obtained. Considering the forklift dynamics model, the overall forklift anti-rollover TS fuzzy model is as follows:

$$\dot{x}(t) = \sum_{i=1}^{2} \lambda_i(\alpha_f)\left(A_i x_c(t) + B_i u(t) + Bw(t)\right) \tag{2-6}$$

$$y(t) = \sum_{i=1}^{2} \lambda_i(\alpha_f) C_i x(t)$$

In formula (2-6) $x_c(t) = [\beta\ \dot{\beta}\ \omega\ \varphi]^T$, $u(t) = F(t)$, $w(t) = [\delta_r\ \varphi_b]^T$ and $z(t) = [LTR]$ are the state, control input, interference input and control output of the above system model, respectively. The correlation matrix is as follows:

$$A_i = \begin{bmatrix} \frac{2(C_{fi}+C_{ri})}{(mI_x - m_s^2h_s^2)v_x} & 0 & 1 - \frac{2(C_{fi}a + C_{ri}b)}{(mI_x - m_s^2h_s^2)v_x} & \frac{m_s^2h_s^2 g}{(mI_x - m_s^2h_s^2)v_x} \\ 1 & 0 & 0 & 0 \\ \frac{2(C_{fi}a + C_{ri}b)}{I_z v_x} & 0 & \frac{2(C_{ri}b^2 - C_{fi}a^2)}{I_z v_x} & 0 \\ -\frac{2m_sh_s(C_{fi}+C_{ri})}{(mI_x - m_s^2h_s^2)v_x} & 0 & -\frac{2m_sh_s(C_{fi}a + C_{ri}b)}{(mI_x - m_s^2h_s^2)v_x} & \frac{mm_sgh_s}{mI_x - m_s^2h_s^2} \end{bmatrix}$$

$$B_i = \begin{bmatrix} -\frac{m_s^2h_sl_1}{(mI_x - m_s^2h_s^2)v_x} & 0 & -\frac{m^2l_1}{mI_x - m_s^2h_s^2} & 0 \end{bmatrix}$$

$$B = \begin{bmatrix} \frac{m_s^2h_sg - mgI_x}{(mI_x - m_s^2h_s^2)v_x} & 0 & -\frac{2C_{ri}b}{I_z} & 0 \end{bmatrix}$$

$$C_i = \begin{bmatrix} \frac{2m_sh_xv_x}{mgB} & 0 & 0 & 0 \\ 0 & \frac{2m_sgh_1}{mgB} & 0 & 0 \end{bmatrix}$$

Step 15. An extended description system can be constructed for the counterbalanced forklift anti-rollover sensor failure system:

$$\begin{cases} \bar{E}\dot{\bar{x}}(t) & = \sum_{i=1}^{r} \mu_i(\xi(t))\left(\bar{A}_i\bar{x}(t) + \bar{B}_iu(t)\right) + \bar{B}_d d(t) + \bar{D}_h h(t) \\ y(t) & = \bar{C}\bar{x}(t) = C_0\bar{x}(t) + h(t) \end{cases} \tag{2-7}$$

$$\bar{x}(t) = \begin{bmatrix} x(t) \\ h(t) \end{bmatrix} \in \square^{n+p}, \bar{E} = \begin{bmatrix} I_n & 0 \\ 0 & 0 \end{bmatrix}$$

$$\bar{A}_i = \begin{bmatrix} A_i & 0 \\ 0 & -I_p \end{bmatrix}, \bar{B}_i = \begin{bmatrix} B_i \\ 0 \end{bmatrix}, \bar{B}_d = \begin{bmatrix} B_d \\ 0 \end{bmatrix}$$

$$\bar{D}_h = \begin{bmatrix} 0 \\ I_p \end{bmatrix}, C_0 = [C\ \ 0], \bar{C} = [C\ \ I_p]$$

$$h(t) = D_f f(t) \in R^p$$

In the counterbalanced forklift anti-rollover fault system, the normal operation of the controller is crucial. Sensor failure will cause the sensor input signal of the controller to deviate, and in severe cases, there may even be no signal input. Therefore, if the sensor fails and its fault signal can be accurately received and an output compensation is performed in time to the output signal according to the controller, the controller will not be affected by the sensor failure and the normal operation of the controller is ensured.

In a specific embodiment, in order to estimate the state and fault of the system at the same time, a singular observer structure is designed as follows:

$$\begin{cases} E\dot{v}(t) & = \sum_{i=1}^{r} \mu_i(\hat{\xi}(t))\left(S_i v(t) + \bar{B}_i u(t)\right) \\ \hat{\bar{x}}(t) & = v(t) + Ly(t) \\ \hat{y}(t) & = C_0\hat{\bar{x}}(t) = C\hat{x}(t) \end{cases} \tag{1-2}$$

In formula (1-2), $v(t) \in R^{n+p}$ is an auxiliary state vector of the singular observer of the system, $\hat{\bar{x}}(t) \in R^{n+p}$ is an estimation in the above extended description system $\bar{x}(t)$. $\hat{\xi}(t)$ is an unmeasured premise variable that partially or completely depends on the estimated state $\bar{x}(t)$. The observer is now simplified in design to find gain $S_i$, E and L, so that the state and fault error estimation conform to a stable generating system. In the above singular observer, the differential term of y(t) does not exist, so this kind of observer is easier to implement in practical engineering.

Sensor failure and unknown interference are assumed in the system model. In order to study the fault estimation and state estimation of the forklift anti-rollover sensor failure system model under continuous time, various general situations will be analyzed.

In a specific embodiment, there is a generalized observer $H(t) \in L_2$, a norm of $L_2$ is defined as:

$$\|H(t)\|_2 = \left(\int_0^{+\infty} H^T(t)H(t)\,dt\right)^{1/2} \tag{1-3}$$

In the above situation, the design task of the generalized observer is to generate a residual signal that is as sensitive to faults as possible and insensitive to disturbances, thereby making fault diagnosis robust. In fact, the problem caused by residuals can be studied by $L_2$ control (extending the control problem $H_\infty$ to nonlinear situations.)

In a specific embodiment, the residual signal generator is designed as follows:

Step 41. by minimizing interfering signals $r_d(t)$ to the residual signal $L_2$ gain to design:

$$r_d(t) = \sum_{i=1}^{r} u_i(\xi(t)) V_i C_0 e_d(t) \tag{1-4}$$

To this end, the following theorem is proposed:

Theorem 1: If there exist positive definite symmetric matrices $P^{11}$, $P^{12}$, $$P_i^2,$$

and matrix $N_1$, $N_2$ and positive scalar $\eta$, then the state observer (1-2) can estimate the system state and sensor fault, and under the following LMI constraints (see (2-8)) the scalar $\gamma$ is minimized.

$$\begin{bmatrix} \Delta_{1j} & * & * & * & * & * \\ \Delta_{2ij} & -H(N_2) & * & * & * & * \\ \tilde{A}_{ij}^T P^{11} & -\tilde{A}_{ij}^T C^T P^{12} & H(P_i^2 A_j) & * & * & * \\ K_{ij} & -B_{ij}^T C^T P^{12} & B_i^T P_i^2 & -\eta^2 I_{n_u} & * & * \\ B_d^T P^{11} & -B_d^T C^T P^{12} & B_d^T P_i^2 & 0 & -\gamma^2 I_{n_d} & * \\ V_i C & 0 & 0 & 0 & 0 & -I_n \end{bmatrix} \leq \tag{2-8}$$

$$0,\ j = 1, \ldots, r$$

$$\begin{cases} \Delta_{1j} & = H(P^{11} A_j) + H(N_1 C) + I_n \\ \Delta_{2ij} & = N_1^T - P_i^{12T} C A_J - N_2 C \end{cases}$$

$$\begin{cases} \tilde{A}_{ij}^T & = A_i^T - A_j^T,\ \tilde{B}_{ij}^T = B_i^T - B_j^T \\ K_{ij} & = (B_i^T - A_j^T) P^{11} \end{cases}$$

$$\begin{cases} \tilde{A}_{ij}^T & = A_i^T - A_j^T,\ \tilde{B}_{ij}^T = B_i^T - B_j^T \\ K_{ij} & = (B_i^T - A_j^T) P^{11} \end{cases}$$

Step 42. obtaining the observer gain through the following method:

$$S_j = \begin{bmatrix} A_j & 0 \\ -C & -I_p \end{bmatrix},\ L = \begin{bmatrix} 0 \\ I_p \end{bmatrix},\ E = \begin{bmatrix} I_n + \Omega C & \Omega \\ \wp C & \wp \end{bmatrix} \tag{2-9}$$

In formula (2-9), two free matrices $\Omega \in R^{n \cdot p}$ and $\wp \in R^{p \cdot p}$ can be used to obtain a non-singular matrix E:

$$\wp = (P_{12}^{-1} N_2 - C P_{11}^{-1} N_1)^{-1} \tag{2-10}$$

$$\Omega = P_{11}^{-1} N_1 \wp \tag{2-11}$$

Step 43. giving an attenuation level of external interference signal residual:

$$\hat{f}(t) = (D_f^T D_f)^{-1} D_f^T \hat{h}(t) \tag{2-12}$$

Assuming $D_f$ has a complete column rank, a sensor estimated value can be obtained through the above method, while ensuring the integrity of the fault estimated value.

In order to achieve fault-tolerant control for the forklift anti-rollover sensor fault-tolerant system, a static output feedback controller is designed for sensor faults and external interference. As shown in FIG. 1, the observer provides fault and state estimation. Therefore, the corresponding control laws must be reallocated. Linear matrix inequalities will give sufficient conditions to ensure a stability of the closed system they produce.

In a specific embodiment, the static output feedback controller is designed as following steps:

Step 51. designing the control law of static output feedback as follows based on parallel distributed compensation:

$$u(t) = \sum_{i=1}^{r} \mu_i(\hat{\xi}(t)) K_i y_c(t) \tag{2-13}$$

In formula (2-13) $K_i$ is an output feedback gain to be determined in the i-th local model, and $y_c(t)$ represents a compensation output, which is defined as:

$$u(t) = \sum_{i=1}^{r} \mu_i(\hat{\xi}(t)) K_i y_c(t) \tag{2-14}$$

$$y_c(t) = y(t) - \hat{h}(t) = y(t) - \ell \hat{\bar{x}}(t),\ \ell = [0\ \ I_p] \tag{2-15}$$

The goal of static output feedback is to control dynamic systems using only knowledge of measurable signals. Therefore, the decision variables are required to depend only on the control input signal u(t), actual output signal y(t), and ultimately rely on measurable state variables. In the case of unmeasurable premise variables, it is still possible to design a stable static output feedback controller. In the structural calculation of the fault-tolerant control law below, both the state derived in the observer and the sensor fault signal estimation are considered.

Step 52. analyzing the stability of the closed-loop system, wherein the system state estimation error $e(t) = \bar{x}(t) - \hat{\bar{x}}(t)$ is generated by the above differential equation (2-9) combined with the following formula:

$$E\dot{e} = \sum_{i=1}^{r}\sum_{j=1}^{r} \mu_i(\xi)\mu_j(\hat{\xi})\left[(S_j L C_0 + \bar{A}_j) e + (\bar{A}_i - \bar{A}_j)\bar{x} + (\bar{B}_i - \bar{B}_j) u + \bar{B}_d d\right] \tag{2-16}$$

By substituting the static output feedback control law (2-13) into the above formula, a conclusion can be drawn as follows:

$$E\dot{e} = \sum_{i=1}^{r}\sum_{j=1}^{r} \mu_i(\xi)\mu_j(\hat{\xi})\left[(S_j e + (\bar{A}_i - \bar{A}_j)\bar{x} + (\bar{B}_i - \bar{B}_j)(K_j \overline{cx} - K_j \ell \bar{x}) + \bar{B}_d d\right] \tag{2-17}$$

Adding and subtracting $(\bar{B}_i - \bar{B}_j) K_j l \bar{x}(t)$, formula (2-17) can be rewritten as:

$$E\dot{e} = \sum_{i=1}^{r}\sum_{j=1}^{r} \mu_i(\xi)\mu_j(\hat{\xi})\left[F_{ij} e + A_{ij}\bar{x} + \bar{B}_d d\right] \tag{2-18}$$

In formula (2-18) $F_{ij}=S_j+(\overline{B}_i-\overline{B}_j)K_j l$; $A_{ij}=(\overline{A}_i-\overline{A}_j)+(\overline{B}_i-\overline{B}_j)K_j(\overline{C}-l)$ Therefore, the above LMI constraint formula is equivalent to:

$$\dot{e}=\sum_{i=1}^{r}\sum_{j=1}^{r}\mu_i(\xi)\mu_j(\hat{\xi})\left[\overline{F}_{ij}e+\overline{A}_{ij}+Gd\right] \quad (2\text{-}19)$$

The entire model is rewritten in a state space representation using the following formula:

$$E^{-1}=\begin{bmatrix} I_n & -\Omega\wp^{-1} \\ -C & \wp^{-1}+C\Omega\wp^{-1} \end{bmatrix}$$

$$\overline{A}_{ij}=\begin{bmatrix} A_i-A_j+(B_i-B_j)K_jC \\ -C(A_i-A_j)-C(B_i-B_j)K_jC \end{bmatrix}$$

$$G=E^{-1}\overline{B}_d=\begin{bmatrix} B_d \\ -CB_d \end{bmatrix}$$

$$\overline{F}_{ij}=\begin{bmatrix} A_j+\Omega\wp^{-1}C & \Omega\wp^{-1}+\left(1+\Omega\wp^{-1}C\right)(B_i-B_j)K_j \\ -CA_j-\left(\wp^{-1}+C\Omega\wp^{-1}\right)C & \begin{matrix}-\left(\wp^{-1}+C\Omega\wp^{-1}\right)- \\ \left(1+\wp^{-1}+C\Omega\wp^{-1}\right)C(B_i-B_j)K_j\end{matrix} \end{bmatrix}$$

An augmented state vector is defined:

$$x_a^T(t)=\left[e^T(t)\;\; x^T(t)\right] \quad (2\text{-}20)$$

The following closed loop system is obtained:

$$\dot{x}_a=\sum_{i=1}^{r}\sum_{j=1}^{r}\mu_i(\xi)\mu_j(\hat{\xi})\times\left\{\begin{bmatrix} F_{ij} & \overline{A}_{ij} \\ 0 & A_i+B_iK_jC \end{bmatrix}x_a+\begin{bmatrix} G \\ B_d \end{bmatrix}\dot{d}\right\} \quad (2\text{-}21)$$

Step 53. The corresponding observer and controller are found to minimize the impact of external disturbance d(t) on the closed-loop system. The emergence of this problem leads to the necessity to solve the standard $L_2$ control under the constraints of linear matrix inequalities provided by the following theorem.

Lemma 1: Considering two real matrices of appropriate dimensions X, Y as well as F(t), for any scalar δ, the following inequality is proved:

$$X^TFY+Y^TF^TX\le\delta X^TX+\delta^{-1}Y^TY,\ \delta>0 \quad (2\text{-}22)$$

Lemma 2: If there is a symmetric positive definite matrix $P_{11}$, $P_{12}$, $P_{2i}$, matrix $Q_1$, $Q_2$ and positive scalar ψ, and $\delta_i$, i=1, . . . , 7 satisfy the following conditions for i, j=1, 2, . . . , r and i≠j, the fault-tolerant control system of the forklift anti-rollover sensor based on the singular observer is asymptotically stable.

$$\min\ \psi \quad (2\text{-}23)$$

$$W_{ii}<0 \quad (2\text{-}24)$$

$$\frac{2}{r-1}W_{ii}+W_{ij}+W_{ji}<0 \quad (2\text{-}25)$$

wherein $$W_{ij}=\begin{bmatrix} Y_{ij}^{(1,1)} & (^*) \\ Y_{ij}^{(2,1)} & Y^{(2,2)} \end{bmatrix} \quad (2\text{-}26)$$

$$Y_{ij}^{(1,1)}=\begin{bmatrix} H(P_{11}A_j)+H(Q_1C) & * & (^*) & (^*) \\ -P_{12}CA_j-Q_2C+Q_1^T & -H(Q_2) & * & * \\ -\hat{A}_{ij}^TP_{11} & -\hat{A}_{ij}^TC^TP_{21} & H\left(P_{2i}^TA_i\right) & (^*) \\ B_d^TP_{11} & -B_d^TC^TP_{21} & B_d^TP_{2i} & -\psi^2I \end{bmatrix} \quad (2\text{-}27)$$

$$Y_{ij}^{(2,1)}=\begin{bmatrix} P_{11}\hat{B}_{ij} & 0 & 0 \\ Q_1C & 0 & 0 \\ 0 & K_j\hat{B}_{ij} & 0 \\ 0 & Q_1C & 0 \\ 0 & Q_2 & 0 \\ 0 & K_j & 0 \\ 0 & P_{21}C\hat{B}_{ij} & 0 \\ 0 & 0 & P_{2i}B_i \\ 0 & 0 & K_jC \end{bmatrix} \quad (2\text{-}28)$$

$$\begin{cases} \hat{A}_{ij}^T=A_i^T-A_j^T \\ \hat{B}_{ij}^T=B_i^T-B_j^T \end{cases};\ \begin{cases} Q_1=P^{11}\Omega\wp^{-1} \\ Q_2=P^{12}\left(R^{-1}+C\Omega\wp^{-1}\right. \end{cases} \quad (2\text{-}29)$$

$$Y^{(2,2)}= -\mathrm{diag}\left(\delta_1+\delta_5\delta_2(\delta_3+\delta_4+\delta_2)^{-1}\times\delta_3\delta_4\delta_1^{-1}\delta_6\delta_7(\delta_5+\delta_6+\delta_7)^{-1}\right) \quad (2\text{-}30)$$

Then through the above formula (2-9) Ω and the following formula ℘, the observer gain is obtained.

$$\wp=\left(P_{12}^{-1}Q_2-CP_{11}^{-1}Q_1\right)^{-1} \quad (2\text{-}31)$$

$$\Omega=P_{11}^{-1}Q_1\wp \quad (2\text{-}32)$$

Step 54: performing stability verification.

To obtain non-conservative conditions, the following non-quadratic Lyapunov function is used:

$$V(e(t),x(t))=\begin{bmatrix} \dot{e}(t) \\ \dot{x}(t) \end{bmatrix}^T\left(\sum_{i=1}^{r}\mu_i(\xi(t))\Lambda_i\right)\begin{bmatrix} e(t) \\ x(t) \end{bmatrix} \quad (2\text{-}33)$$

In the above formula $\Lambda_i=\mathrm{diag}[P_1, P_{2i}]$, wherein $P_1$, $P_{2i}$ are symmetric positive definite matrices. A closed-loop system with fault-tolerant control is stable, and if $\dot{V}(x_a(t))+e^T(t)e(t)-\eta^2d^T(t)d(t)<0$, η can limit the gain $L_2$ from d(t) to e(t). The derivative of Lyapunov function $V(x_a(t))$ is expressed as:

$$\dot{V}(x_a)=\sum_{i=1}^{r}\sum_{j=1}^{r}\mu_j(\xi_f)\mu_j(\hat{\xi}_f)x_a^TH\left(\Lambda_i^T\begin{bmatrix} \overline{F}_{ij}i & \overline{A}_{ij} \\ 0 & A_i+B_iK_jC \end{bmatrix}\right)x_a+ H\left(x_a^T\Lambda_i\begin{bmatrix} G \\ B_d \end{bmatrix}d\right) \quad (2\text{-}34)$$

This condition is negative definite, if $$\sum_{i=1}^{r}\sum_{j=1}^{r}\mu_j(\xi_f)\mu_j(\hat{\xi}_f)\begin{bmatrix}\Xi_{ij} & (*) & (*)\\ \overline{A}_{ij}P_1 & H\left(P_{2i}^TA_i\right)+H\left(P_{2i}^TB_iK_jC\right) & (*)\\ G^TP_1 & B_d^TP_{2i} & -\psi^2 I\end{bmatrix}<0 \quad (2\text{-}35)$$

wherein $$\Xi_{ij}=\begin{bmatrix}H(P_{11}A_j)+H(Q_1C) & (*)\\ -P_{12}CA_j-Q_2C+Q_1^T+ & -H(Q_2)-H\left(P_{12}C\hat{B}_{ij}K_j\right)-\\ K_j^T\hat{B}_{ij}^TP_{11}+K_j^T\hat{B}_{ij}^TC^TQ_1^T & H\left(Q_2\hat{B}_{ij}K_j\right)\end{bmatrix} \quad (2\text{-}36)$$

In formula (2-36);

$$\begin{cases}\Psi_{ij}^{12}=P_{12}CA_j-Q_2C+Q_1^T+K_j^T\hat{B}_{ij}^TP_{11}+K_j^T\hat{B}_{ij}^TC^TQ_1^T\\ \Psi_{ij}^{13}=\hat{A}_{ij}^TP_{11}+C^TK_j^T\hat{B}_{ij}^TP_{11}\\ \Psi_{ij}^{23}=-\hat{A}_{ij}^TC^TP_{21}-C^TK_j^T\hat{B}_{ij}^TC^TP_{21}\\ \Psi_{ij}^{22}=-H(Q_2)-H\left(P_{12}C\hat{B}_{ij}K_j\right)-H\left(Q_2\hat{B}_{ij}K_j\right)\\ \Psi_{ij}^{33}=H\left(P_{2i}^TA_i\right)+H\left(P_{2i}^TB_iK_jC\right)\end{cases} \quad (2\text{-}37)$$

Using the lemma 1 proposed above, there is a positive scalar $\delta_i$, i=1, . . . , 7 let:

$$\sum_{i=1}^{r}\sum_{j=1}^{r}\mu_j(\xi_f)\mu_j(\hat{\xi}_f)\begin{bmatrix}\Xi_{ij}^{11} & * & (*) & (*)\\ -P_{12}CA_j-Q_2C+Q_1^T & \Xi_{ij}^{22} & * & *\\ \hat{A}_{ij}^TP_{11} & -\hat{A}_{ij}^TC^TP_{21} & \Xi_{ij}^{33} & (*)\\ B_d^TP_{11} & -B_d^TC^TP_{21} & B_d^TP_{2i} & -\psi^2 I\end{bmatrix} \quad (2\text{-}38)$$

In formula (2-38);

$$\begin{cases}\Xi_{ij}^{11}=H(P_{11}A_j)+H(Q_1C)+\left(\delta_1^{-1}+\delta_5^{-1}\right)P_{11}\hat{B}_{ij}\hat{B}_{ij}^TP_{11}+\\ \qquad \delta_2^{-1}Q_1CC^TQ_1^T\\ \Xi_{ij}^{22}=H(Q_2)+(\delta_3+\delta_2+\delta_4)K_j^T\hat{B}_{ij}^TK_j\hat{B}_{ij}^T+\delta_3^{-1}Q_1CC^TQ_1^T+\\ \qquad \delta_4^{-1}Q_2^TQ_2+\delta_1K_j^TK_j+\delta_6^{-1}P_{21}C\hat{B}_{ij}\hat{B}_{ij}^TP_{21}\\ \Xi_{ij}^{33}=H\left(P_{2i}^TA_i\right)+\delta_7^{-1}P_{2i}B_iB_i^TP_{2i}+(\delta_5+\delta_6+\delta_7)C^TK_j^TK_jC\end{cases} \quad (2\text{-}39)$$

Applying Schur's complement on BMI items $$\Xi_{ij}^{11}\ \Xi_{ij}^{22}\text{ and }\Xi_{ij}^{33},$$

wherein the sufficient linear matrix inequality condition proposed in Theorem 2 is established.

Embodiment 2

For the forklift anti-rollover sensor fault-tolerant system, the above-mentioned effective control strategy is designed so that the forklift anti-rollover system can still ensure a stability of the entire system in case of sensor failure. In this section, numerical simulations are performed to demonstrate the effectiveness and applicability of the proposed method to a forklift anti-rollover sensor fault-tolerant system. The T-S model constructed in the previous article is used to construct an observer, which represents a forklift anti-rollover sensor fault-tolerant system with premise variables that depend on unmeasurable state variables. In the design, the complete vehicle parameters of the forklift considered are shown in the table 1.

TABLE 1

| Parameter | Value |
|---|---|
| Vehicle quality (M) | 3139 kg |
| Full load quality ($m_1$) | 4639 kg |
| Frame quality ($m_s$) | 2356 kg |
| Distance between front axle and mass center (a) | 1 m |
| Distance between rear axle and mass center (b) | 0.7 m |
| Distance between front and rear axles (L) | 1.7 m |
| Front track ($B_1$) | 1 m |
| Rear track ($B_2$) | 0.97 m |
| Distance between limit block and roll center (l) | 0.3 m |
| Height of mass center ($h_1$) | $B_2$ 1 m |
| Height of mass center and roll center ($h_x$) | 0.75 m |
| Front/rear wheel radius ($R_f/R_r$) | 355 mm/265 mm |
| Moment of inertia of wheels (J) | 2 kg · m$^2$ |
| Moment of inertia of vehicle around Z-axis ($I_z$) | 6129 kg · m$^2$ |
| Moment of inertia of frame around X-axis ($I_x$) | 3100 kg · m$^2$ |
| Vertical stiffness of front wheel ($T_1$) | 8000 kg · m$^2$ |
| Equivalent contact stiffness ($K_s$) | 7630 N · M |
| Equivalent contact damping ($C_s$) | 300 N · m/s |
| Longitudinal speed ($v_x$) | 6 m/s |
| Cornering stiffness of front wheel ($C_{fi}$) | 145500 N/rad |
| Cornering stiffness of rear wheel ($C_{ri}$) | 145500 N/rad |

The output behavior of the system affected by fault signals $f(t)=(f_a(t),f_b(t))^T$ is considered and described as follows:

$$f_a(t)=0.3\sin(t+2)e^{\frac{t}{5}},\ 4s\le t\le 10s \quad (2\text{-}40)$$

$$f_b(t)=\begin{cases}0.1(t-1) & 12s\le t<15s\\ 0.01(t-1) & 15s\le t<18s\\ 0 & \text{others}\end{cases} \quad (2\text{-}41)$$

For the forklift anti-rollover system, a gyro sensor is used. The gyro sensor can only measure the yaw angular velocity of the forklift. The proposed observer is used to estimate the lateral speed to solve the optimization problem under the linear matrix inequality constraints in the above theorem (2), resulting in the observer and controller gain matrices for the following nominal attenuation levels $\psi$=0.843.

$$S_1=\begin{bmatrix}-6.9425 & -0.8758 & 0 & 0\\ 26.8958 & -7.7952 & 0 & 0\\ 1.4062 & 1.9354 & -1 & 0\\ 0 & -1 & 0 & -1\end{bmatrix}, \quad (2\text{-}42)$$

-continued $$S_2 = \begin{bmatrix} -0.4751 & -0.9968 & 0 & 0 \\ 0.6997 & -0.4918 & 0 & 0 \\ 1.4062 & 1.9354 & -1 & 0 \\ 0 & -1 & 0 & -1 \end{bmatrix}$$

$$L = \begin{bmatrix} 0 & 0 & 1 & 0 \\ 0 & 0 & 0 & 1 \end{bmatrix}^T, \wp = \begin{bmatrix} 0.0876 & 0.1478 \\ 0.0299 & 0.0577 \end{bmatrix}, \quad (2\text{-}43)$$

$$\Omega = \begin{bmatrix} 0.0936 & 0.1878 \\ -0.2219 & -0.5128 \end{bmatrix}$$

$$K_1 = [-0.0019 \;\; 0.0020], K_2 = [-0.0020 \;\; 0.0020] \quad (2\text{-}44)$$

$$E = \begin{bmatrix} 0.8684 & 0.0066 & 0.0936 & 0.1878 \\ 0.3121 & 0.9167 & -0.2219 & -0.5128 \\ -0.1232 & -0.0218 & 0.0876 & 0.1478 \\ -0.0420 & -0.0001 & 0.0299 & 0.0577 \end{bmatrix} \quad (2\text{-}45)$$

Figure 2:
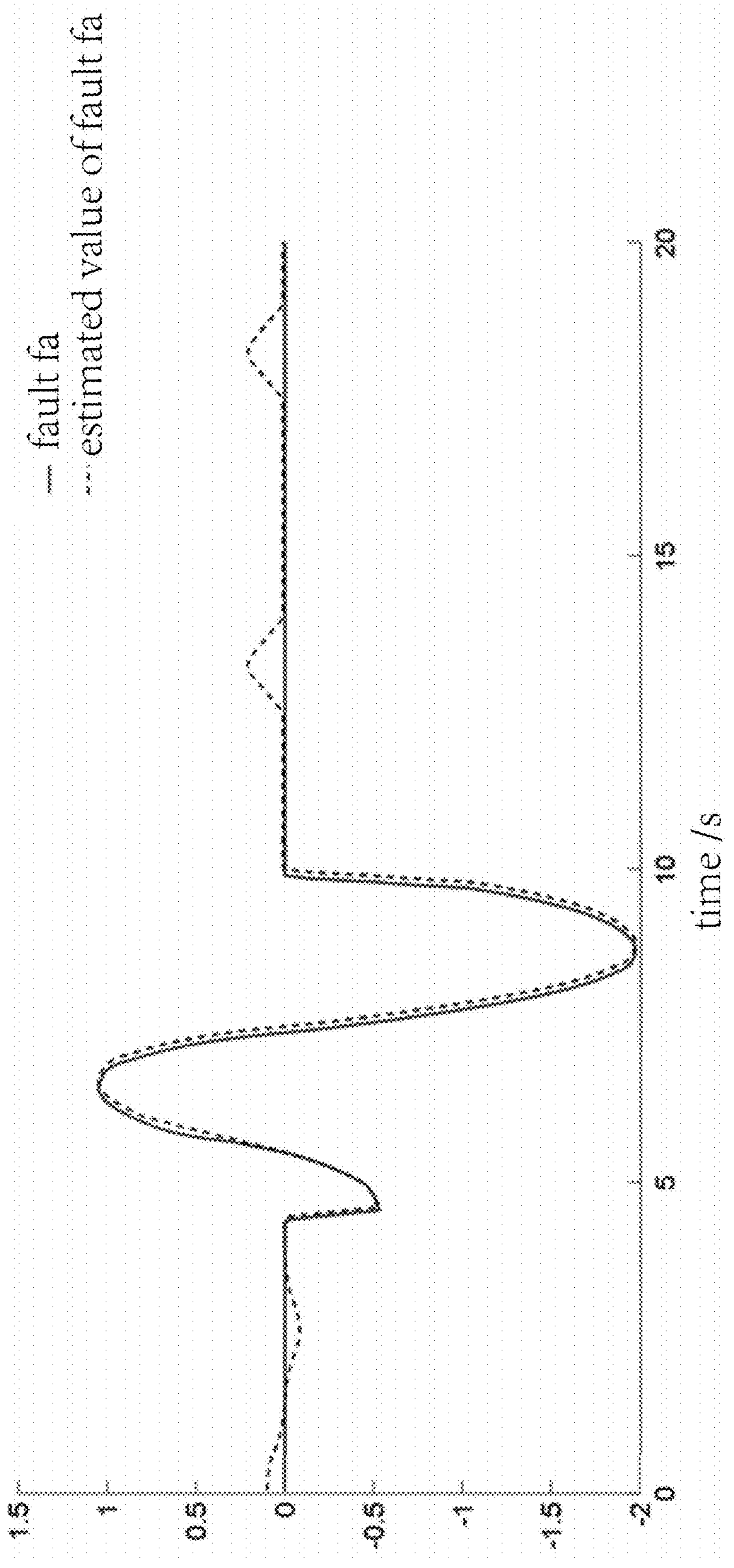
FIG. 2 is the signal diagram of the signal of fault fa and its estimated value.
Figure 3:
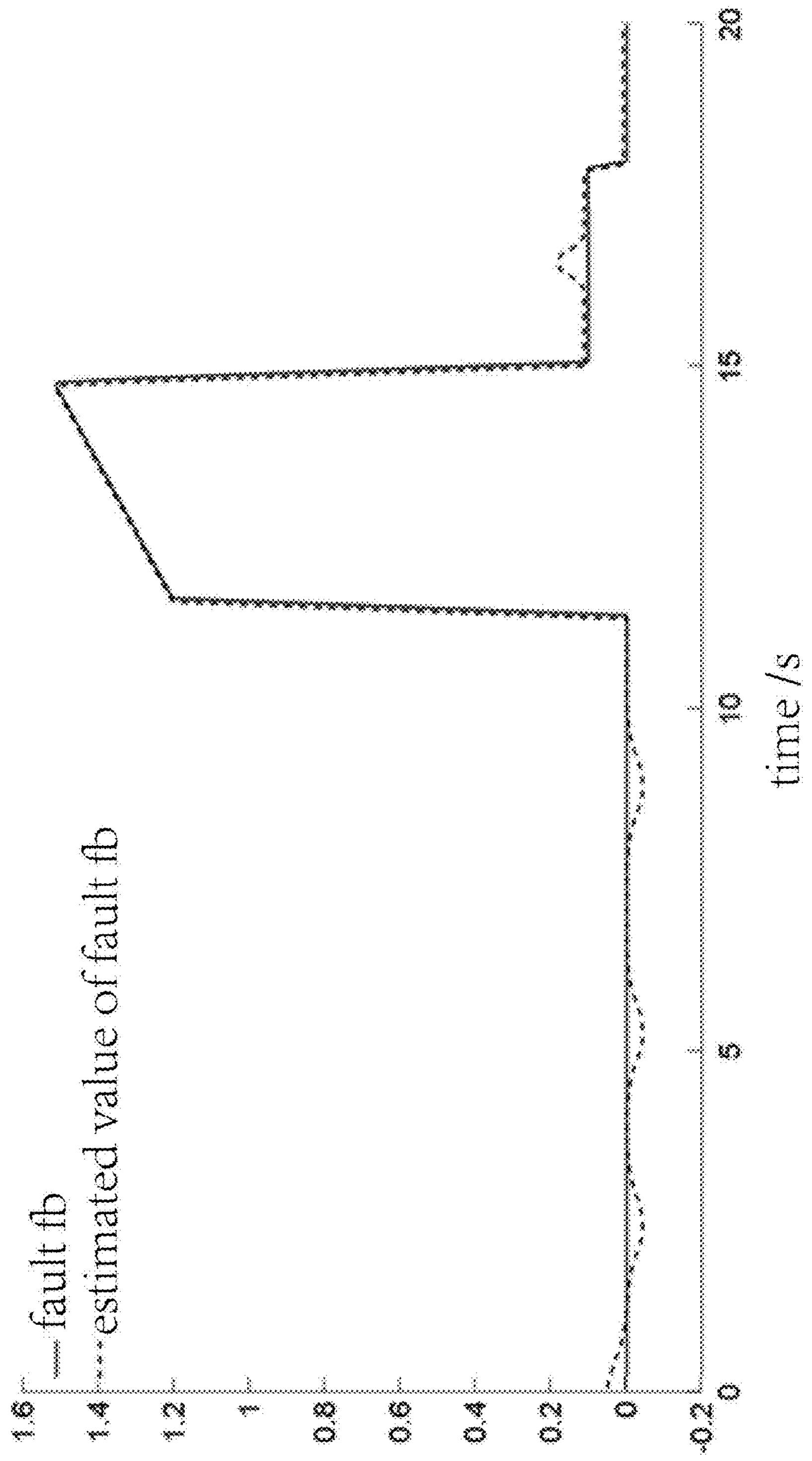
FIG. 3 is the signal diagram of the signal of fault fb and its estimated value.
Figure 4:
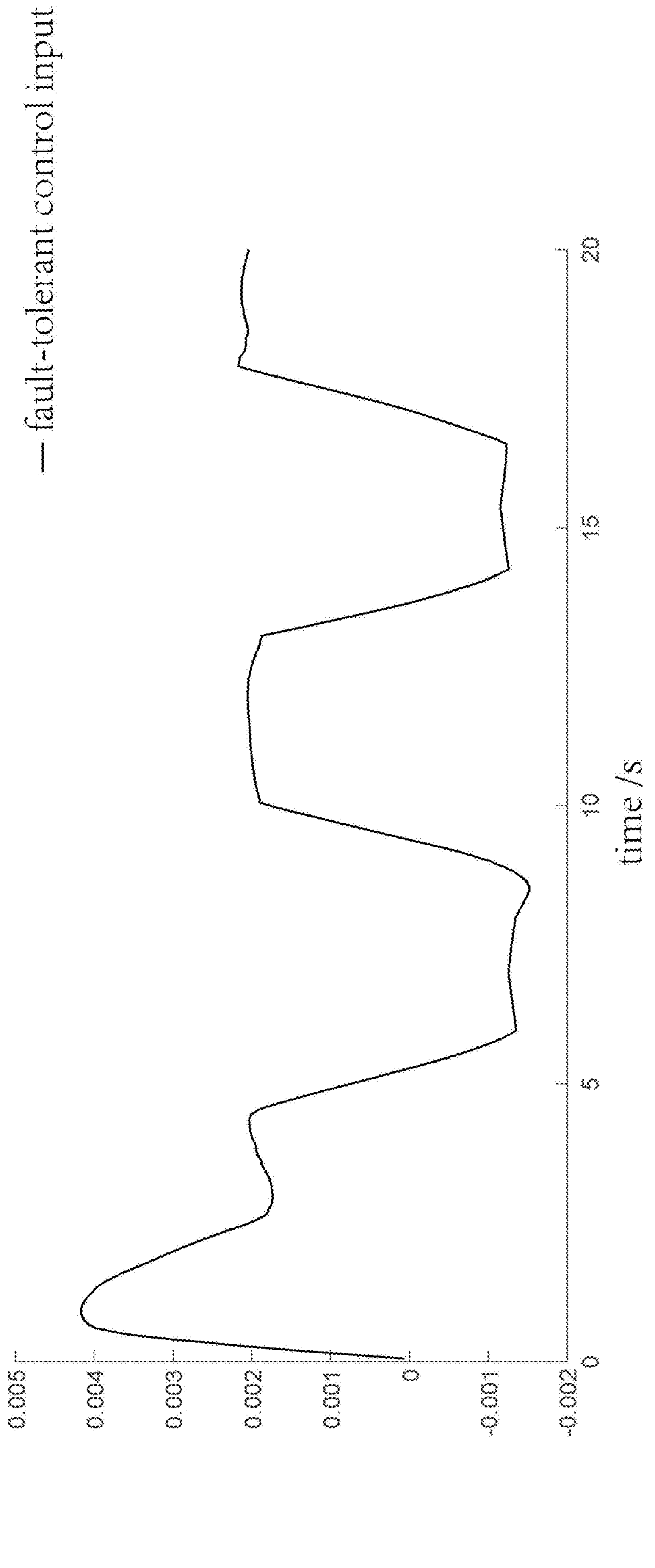
FIG. 4 is the input state diagram of fault-tolerant control of the static output feedback.
Figure 5:
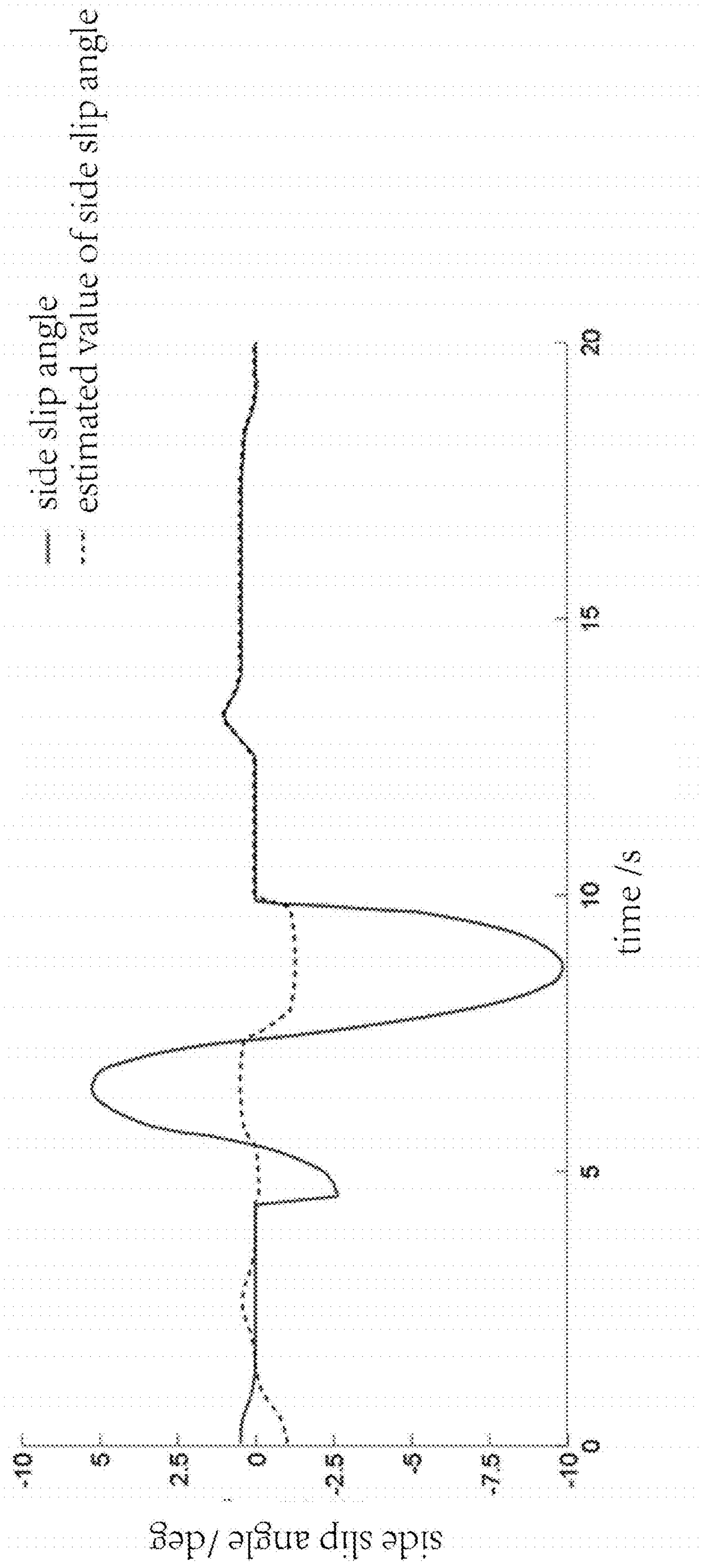
FIG. 5 shows the side slip angle of the forklift body and its estimated value when there is no fault tolerance.
Figure 6:
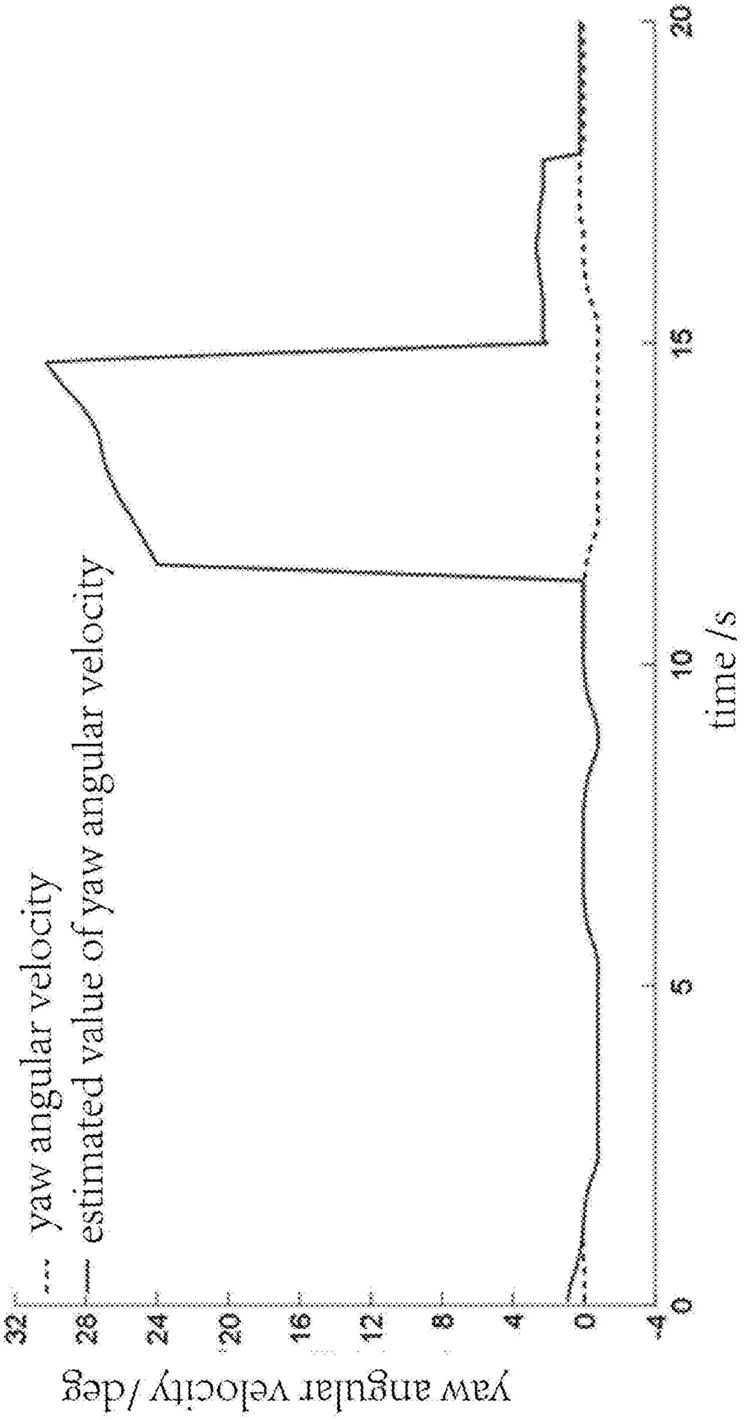
FIG. 6 shows the yaw angular velocity of the forklift body and its estimated value when there is no fault tolerance.
Figure 7:
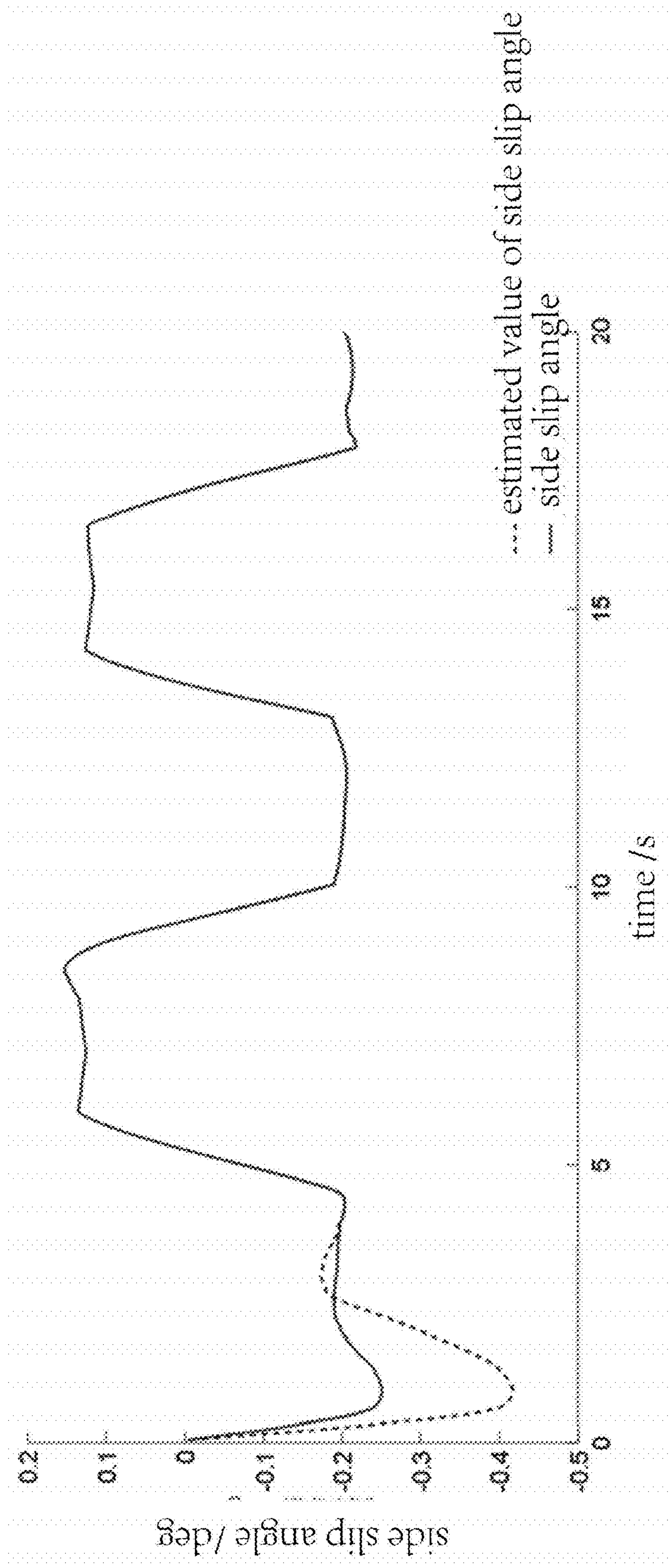
FIG. 7 shows the side slip angle of the forklift body and its estimated value under fault-tolerant control.
Figure 8:
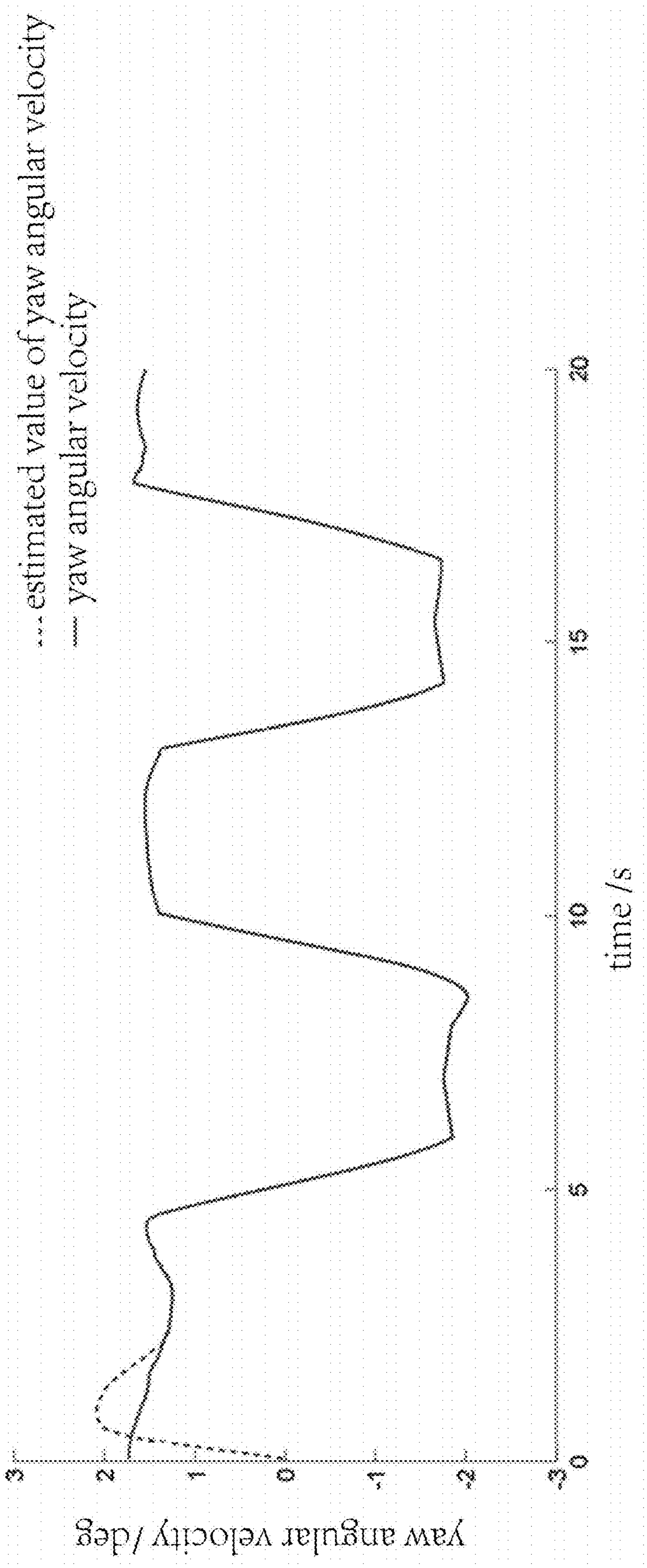
FIG. 8 shows the yaw angular velocity of the forklift body and its estimated value under fault-tolerant control.

As an embodiment of the present invention, FIG. 2, FIG. 3 and FIG. 4 respectively illustrate the fault $f_a$ signals and their estimated value signals, fault $f_b$ signals and their estimated value signals, fault-tolerant control input state of the static output feedback. FIGS. 5 and 6 respectively show the side slip angle of the forklift body and its estimated value as well as the yaw angular velocity and its estimated value without fault tolerance. FIGS. 7 and 8 respectively show the side slip angle of the forklift body and its estimated value as well as yaw angular velocity and its estimated value under fault-tolerant control.

For the case of using the static output feedback fault-tolerant control strategy, it can be noted that when the system sensor fails, despite the system failure and external interference, the forklift anti-rollover system still remains stable. When a fault occurs, the maximum fluctuation of the side slip angle and the yaw angular velocity remains no more than 3% of the maximum angle value without using the static output feedback fault-tolerant control strategy. Therefore, it is shown that the static output feedback fault-tolerant control strategy proposed in this application is effective.

In another aspect, the present invention also discloses a computer readable storage medium storing a computer program, when the computer program is executed by a processor, the processor performs the steps of any of the above methods.

In another aspect, the present invention also discloses a computer device, comprising a memory and a processor, wherein the memory stores a computer program, and when the computer program is executed by the processor, the processor performs the steps of any of the above methods.

In yet another embodiment of this application, a computer program product containing instructions is also provided, when it runs on a computer, the computer performs the steps of any of the methods in the above embodiments.

It can be understood that the system provided by the embodiments of the present invention corresponds to the method provided by the embodiments of the present invention. For explanations, examples and beneficial effects of relevant content, reference can be made to the corresponding parts of the above method.

Those of ordinary skill in the art can understand that all or part of the processes in the methods of the above embodiments can be implemented by instructing relevant hardware through computer programs. The programs can be stored in a non-volatile computer-readable storage medium, when the program is executed, it may include the processes of the embodiments of the above-mentioned method. Any reference to memory, storage, database or other media used in the embodiments of this application may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain (Synchlink), DRAM (SLDRAM), memory bus (Rambus), direct RAM (RDRAM), direct memory bus dynamic RAM (DRDRAM), and memory bus dynamic RAM (RDRAM), etc.

The above embodiments are only used to illustrate the technical solutions of the present invention, but not to limit them. Although the present invention has been described in detail with reference to the foregoing embodiments, those of ordinary skill in the art should understand that they can still modify the technical solutions described in the foregoing embodiments, or make equivalent substitutions for some of the technical features. However, these modifications or substitutions do not cause the essence of the corresponding technical solutions to deviate from the spirit and scope of the technical solutions of the respective embodiments of the present invention.

What is claimed is:

1. A static output feedback control method for forklift stability control, performed by a processor of a computer device mounted on a counterbalanced forklift having a gyro sensor, comprising the following steps:

constructing a continuous-time forklift anti-rollover fuzzy system model with formula (1-1):

$$\begin{cases} \dot{x}(t) = \sum_{i=1}^{r} u_i(\xi(t))(A_i x(t) + B_i u(t)) + B_d d(t) \\ y(t) = Cx(t) + D_f f(t) \end{cases} \quad (1\text{-}1)$$

in formula (1-1), x(t) represents a state vector at time t; $f(t) \in R^s$ is a sensor fault vector; $d(t) \in R^{nd}$ is an unknown bounded disturbance vector; matrix $B_d$ and $D_f$ have appropriate dimensions, and at the same time $D_f$ is assumed to be a full column rank;

using an excitation function $u_i(\xi(t))$ as an input of a system by setting the continuous-time fuzzy system model, and sensor failures and unknown bounded disturbances existing simultaneously;

setting a singular observer for estimating a state $\overline{x}(t)$ of the counterbalanced forklift anti-rollover fuzzy system and an output failure $\overline{y}(t)$ simultaneously;

setting a generalized observer for measuring a state of the counterbalanced forklift anti-rollover system in a continuous time and performing fault estimation, generating a residual signal $L_2$ that is as sensitive to faults f(t) as possible and insensitive to disturbances d(t);

extending $H_\infty$ control problem to nonlinear situations by setting a residual generator and using the residual signal $L_2$ for control, observing an minimized interference signal $r_d(t)$ to obtain a gain of the residual signal $L_2$, finding a corresponding positive definite matrix and a positive scalar, and then progressively estimating a system state and sensor failures;

reconfiguring control laws through the fault and state estimation provided by the above observer, and giving sufficient conditions in form of LMIs (Linear Matrix Inequalities) to ensure a stability of a resulting closed-loop system; and controlling, by the processor, the counterbalanced forklift based on the control laws to perform an output compensation to an output signal of the gyro sensor when a sensor failure occurs, so that the forklift anti-rollover system remains stable.

2. The static output feedback control method for forklift stability control according to claim 1, wherein the singular observer is used to simultaneously estimate the state $\hat{\bar{x}}(t)$ and the output failure $\hat{\bar{y}}(t)$ of the forklift anti-rollover fuzzy system, as follows:

$$\begin{cases} E\dot{v}(t) = \sum_{i=1}^{r} \mu_i(\hat{\xi}(t))(S_i v(t) + \bar{B}_i u(t)) \\ \hat{\bar{x}}(t) = v(t) + Ly(t) \\ \hat{y}(t) = C_0\hat{x}(t) = C\hat{x}(t) \end{cases} \tag{1-2}$$

in formula (1-2), $v(t) \in R^{n+p}$ is an auxiliary state vector of the observer; $\hat{\bar{x}}(t) \in R^{n+p}$ is an estimation of $\bar{x}(t)$;$\hat{\xi}(t)$ is an unmeasured premise variable; $S_i$, E, L are observer gains.

3. The static output feedback control method for forklift stability control according to claim 1, wherein constructing the generalized observer $H(t) \in L_2$ with formula (1-3), a norm of $L_2$ is defined as:

$$\|H(t)\|_2 = \left(\int_0^{+\infty} H^T(t)H(t)dt\right)^{1/2}. \tag{1-3}$$

4. The static output feedback control method for forklift stability control according to claim 1, wherein constructing the residual generator $r_d(t)$ with formula (1-4), $$r_d(t) = \sum_{i=1}^{r} u_i(\xi(t))V_i C_0 e_d(t). \tag{1-4}$$

5. The static output feedback control method for forklift stability control according to claim 1, wherein designing the control law of a reconfigured static output feedback controller with formula (1-5):

$$\begin{cases} u(t) = \sum_{i=1}^{r} \mu_i(\hat{\xi}(t))K_i y_c(t) \\ y_c(t) = y(t) - \hat{h}(t) = y(t) - \ell\hat{\bar{x}}(t) \end{cases} \tag{1-5}$$

in formula (1-5), $K_i$ is an output feedback gain to be determined; $y_c(t)$ is a compensation output; $\hat{h}(t)$ is an estimated system output; $l=[0\ I_p]$.

6. A non-transitory computer readable storage medium storing a computer program, when the computer program is executed by the processor, the processor performs the steps of the method according to claim 1.

* * * * *